Dec. 11, 1951  E. BODMER  2,578,221
AUTOMATIC SCREW CUTTING LATHE
Filed April 8, 1946  2 SHEETS—SHEET 1
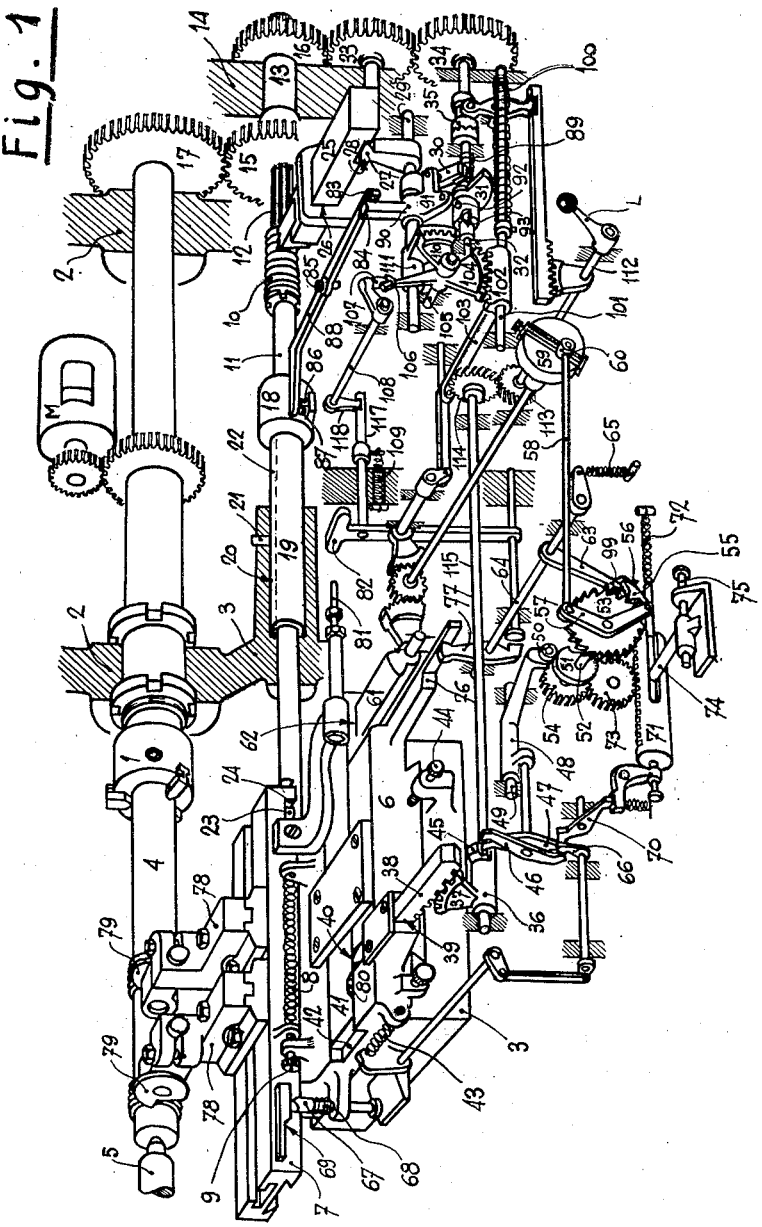
INVENTOR
ERNEST BODMER,
BY
ATTORNEY

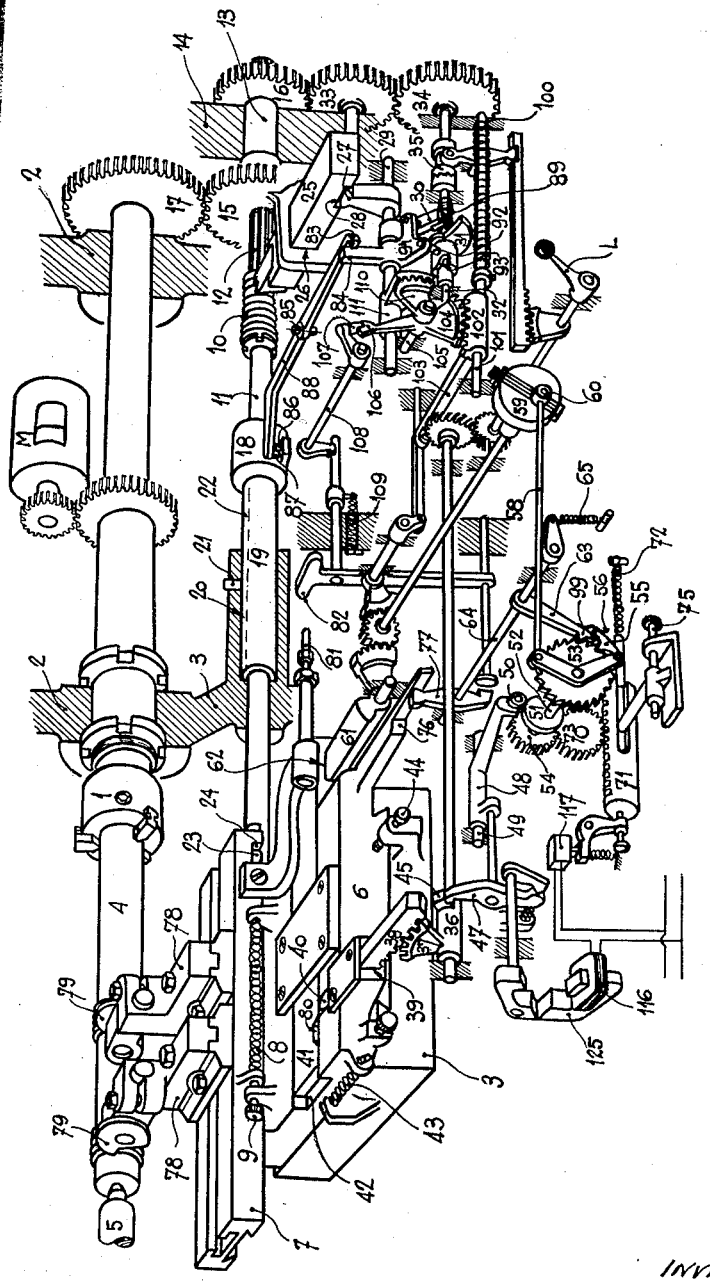

Patented Dec. 11, 1951

2,578,221

UNITED STATES PATENT OFFICE 2,578,221

AUTOMATIC SCREW-CUTTING LATHE

Ernest Bodmer, Grand-Lancy-Geneve, Switzerland, assignor to Tarex S. A., Geneva, Switzerland, a corporation of Switzerland Application April 8, 1946, Serial No. 660,502
In Switzerland June 6, 1945

4 Claims. (Cl. 10—105)

Automatic screw cutting lathes most appreciated at the present time are provided with a device for controlling the movement of the crossed slides of the tool holder having a lead screw, driven in rotation, cooperating with a nut sliding parallel to the axis of the lead screw and capable of reciprocation in a plane perpendicular to this axis. Cams produce at the beginning and end of the working stroke the engagement and disengagement respectively of the nut with the lead screw. The movements of the nut, parallel to the axis of the lead screw, control the movements of the longitudinal slide of the tool holder. These lathes have certain disadvantages due to the fact that the nut must be capable of carrying out movements in two planes perpendicular to one another on the one hand, and on the other hand due to the fact that the disengagement of the nut from the lead screw at the end of the working stroke is produced by a cam. In fact in order to enable the nut to carry out movements in two planes perpendicular to one another, manufacturers have in general secured the nut to a sleeve mounted on a rod capable of sliding in its bearings. It will be obvious that such a mounting is difficult to realise as when a great precision of screw cutting is required, the clearances must be reduced to a minimum. Further the sleeve has in general a collar adjustable in longitudinal position. The collar is provided with a nose adapted to operate with the cams at the beginning and end of the working stroke of the tool. But it is clear that the bearing length which the said nose can present to the cam which acts thereon is at the maximum equal to the pitch of the thread of the lead screw. The nose and the cam thus wear rapidly and the control of the release of the nut is liable to be effected a revolution too late. Consequently the tool is liable to bite into the material and either to be broken or in any case heated to such a point that its resharpening is necessary. But after each resharpening the whole adjustment of the lathe must be effected afresh and controlled if it is desired to obtain a precision screw thread. Further according to the degree of wear of the nose cooperating with the cam, it is possible that the nut remains half engaged with the lead screw. In this case there occurs a local rapid wear of the lead screw and nut.

Finally the disengaging movement of the screw cannot be sudden as it is actuated by a cam which must necessarily carry out a predetermined angle of rotation in order to effect this actuation. But this angle of rotation corresponds with an angle of rotation of the lead screw. Consequently the nut wears the threads of the lead screw along a spiral, or, when the nut is of a soft metal, it is the latter which wears prematurely. It is clear that this wear prevents any precision machining.

From the foregoing it will be seen that the lead screws and the nuts of known automatic screw cutting lathes wear relatively rapidly and particularly non-uniformly so that it is necessary to test them frequently.

For the purpose of eliminating some of the disadvantages referred to, some manufacturers have hinged the nut holder directly on the longitudinal slide of the tool holder carriage. Such a construction, however, is not desirable as it increases the weight of the tool holder carriage on the one hand and on the other hand this construction does not eliminate the disadvantages due to the actuation of the nut by two cams, one for the control of its disengagement, the other for the control of its engagement.

Finally this control of the engagement and disengagement of the nut by means of two cams does not allow of obtaining a certain control at high speeds of cutting which are allowed by tools of special steel actually used. In fact in order that the control of the engagement of the nut with the lead screw is effected in a satisfactory manner, it is necessary for the nut holder sleeve and thus the entire longitudinal slide of the tool holder to effect its return stroke to the starting position in a period of time in any case less than the period of time corresponding with a complete revolution of the cams. It is clear that the higher the speed of cutting, the higher the speed of rotation of the cams and further the shorter the lapse of time still admissible for the return of the carriage. In fact the speed of rotation of the cams may be less than that of the lead screw. However these two speeds must be synchronised and further the speed of the cams cannot be much less than that of the lead screw if not the engagement and the disengagement of the shoe takes place over a very large angular movement of the lead screw, which produces an exaggerated wear of the latter on the one hand and on the other hand the necessity of providing a sufficient longitudinal dead stroke for enabling the inward and outward movement of the tool. But the special steels actually used allow of cutting speeds such that it is no longer possible to guarantee a sufficiently rapid return of the carriage and consequently the nut holder strikes against the lateral face of the actuating cam for the engagement of the nut with the lead screw.

Lathes provided with two lead screws, one for the control of the working stroke, the other for the control of the return stroke, do not enable losses of time to be avoided. In fact, although they permit of machining at all desired speeds of cutting, the control of the return of the carriage into the normal position is always the cause of a considerable loss of time.

The invention has for its subject an automatic screw cutting lathe which is provided with a workpiece carrying spindle and a tool holder with crossed slides of which the longitudinal movements are controlled by a lead screw co-operating with a nut. This lathe is distinguished from lathes known up to the present time by the fact that it has a quick action relay set in operation at the end of each working stroke and producing the disengagement of the nut at a speed independent of the speed of rotation of the spindle.

A form of construction of an automatic screw cutting lathe is shown diagrammatically and by way of example in perspective view in the accompanying drawings Figs. 1 and 2 representing different embodiments of the invention.

The lathe shown is provided with a spindle 1 rotating in bearings 2 provided in a framework 3 of the lathe. The spindle 1 is driven in rotation by a motor M and carries the part 4 to be machined. A back centre 5 holds the latter in position at its free end.

The lathe is provided with a tool holder carriage with crossed sides, of which the transverse slide 6 is guided by guides provided in the framework 3 and carries the longitudinal slide 7 guided by guides, provided in the transverse slide 6. The longitudinal slide 7 is subjected to the action of a return spring 8 tending to hold it in engagement with a rest stop 9 adjustable in position.

The longitudinal slide 7 is connected by transmission members to a lead screw or "master" 10. The latter is driven in rotation by the motor M and by means of an interchangeable gear train. The lead screw is mounted rigidly on a shaft 11 of which one end 12 is grooved and slides inside a sleeve 13. This sleeve rotates in a bearing 14 provided in the framework of the lathe and carries two gears 15, 16 each secured rigidly to one of its ends. The gear 15 gears with a toothed wheel 17 secured to the shaft of the spindle 1. The shaft 11 is thus driven in rotation by the motor M, further it is connected by means of a coupling 18 to a pusher 19 sliding in a guide 20 provided in the framework of the lathe. A finger 21, engaging with a groove 22, prevents any angular movement of the pusher. At its free end the pusher carries a finger 23 engaging with a transverse groove 24 of the slide 7. The nut 25 slides in a seating 26 provided in the framework. An actuating finger 27 engaging with a seating 28 controls the movements of the nut producing its engagement with and its disengagement from the lead screw 10. The finger 27 is mounted rigidly on a shaft 29 turning in bearings provided in the framework of the lathe. The shaft 29 also carries a lever 30 of which the free end cooperates with a cam 31 producing the engaging movements of the nut at each return of the carriage to the position of rest. The cam 31 is secured to a shaft 32 driven in rotation by the motor M and by means of gears 17, 15, 16, 33, 34 and a clutch 35. The disengagement of the nut, on the contrary, is produced by a quick action relay set in operation at the end of each working stroke of the tool. This relay is formed by a spring 100 mounted on a rod 101 sliding in seatings provided in the framework and carrying a rack 102 and a pusher 103.

The rack 102 engages with a toothed sector 104 mounted rigidly on a shaft 105 and provided with an arm 106 of which the end cooperates with a finger 107. The latter is mounted on a shaft 108 of which the angular movements are controlled, against the action of a return spring 109, by the movements of the longitudinal slide 7.

A second toothed sector 110, secured to the shaft 105, engages with a toothed sector 111 secured to the shaft 29 and thus connects the rod 101 mechanically to the finger 27 which controls the movements of the nut.

The pusher 103 is connected by a train of transmission members:

1. To a crank pin 60 for controlling the advance of the tool in depth between each pass,
2. To an oscillating finger 61 engaging with a groove 62 of the rule 41 and controlling the movements of this and thus the withdrawal of and engagement of the tool with the workpiece which is being machined at the end and beginning of each cut.

The engaging and disengaging movements of the driving and driven parts of the clutch 35 are controlled manually. For this purpose one of the parts of the clutch 35 is connected by means of transmission members to an operating member L. The latter is also connected, by a train of transmission members comprising a shaft 112 rigid with handle L and gear 113 meshing with gear 114 on shaft 115, to a sleeve 36 fixed to shaft 115 carrying toothed sector 37 engaging with a rack 38 sliding in a guide 39 provided in the transverse slide 6. The end 40 of this rack cooperates with the lateral face of a rule 41 sliding in a guide 42 of the slide 6. The guide 42 is arranged in a plane perpendicular to the plane of the guide 39 and a spring 43 tends to hold the lateral face of the rule in contact with the end 40 of the rack. The operation of the member L thus produces simultaneously:

1. The engagement of the driven and driving parts of the clutch 35,
2. The setting in the transverse position at the start of operation of the tool holder carriage by the movement of the transverse slide 6 against the action of its return spring 43 which tends to hold it in the position of rest, that is to say in engagement with a rest stop 44 adjustable in position.

The sleeve 36 also carries a nose 45 cooperating with two levers 46, 47 for the purpose of maintaining the transverse slide in the operating position against the action of the return spring 43. These levers thus form with the nose 45 two bolts of which the opening of one is controlled at the end of each cut, whilst the opening of the other is controlled at the end of machining a screw thread.

The levers 46, 47 are pivoted on one of the arms of a lever 48 itself pivoted on a stationary shaft 49. The other arm of this lever 48 carries a roller 50 cooperating with a rotary cam 51 mounted on a shaft 52 turning in bearings (not shown) provided in the framework of the lathe. The shaft 52 also carries, fixed rigidly thereto, a ratchet wheel 53 and a toothed wheel 54. A feed pawl 55 cooperates with the ratchet wheel 53 for the purpose of producing, between each cut, an angular movement of the rotary cam 21, and by means of the lever 47 a movement, in the direction of the part to be machined, of the transverse slide 6 of the tool holder carriage. The feed pawl 55 is hinged on a lever 57 pivoted loosely on the shaft 52 and is subjected to the action of a spring 56 tending to hold it in engagement with the teeth of the wheel 53. The lever 57 is connected by a rod 58 to the crank for controlling the advance in depth of the tool. This is formed by a disc 59 cooperating with a crank pin 60 adjustable in radial position. As indicated above the disc 59 is connected mechanically by a train of transmission members to the rod 101 subjected to the action of a spring 100.

A retaining pawl 63, secured to a shaft 64 rotating in bearings provided in the framework of the lathe, cooperates, under the action of a return spring 65, with the ratchet wheel 53. The pawl 63 is adapted to hold the ratchet wheel 53 in an angular position during the return stroke of the feed pawl 55. The disengagement of this retaining pawl is produced at the end of machining by the return of the transverse slide to the rest position. For this purpose the slide 6 carries a control ramp 76 cooperating with a finger 77 secured to the shaft 64. One of the levers 46 is disengaged from the nose 45 at the end of each return stroke, to the rest position, of the longitudinal slide, that is to say after each cut, by means of a pusher 66. The latter is connected mechanically to a finger 67 guided in a bore provided in the transverse slide 6 and cooperating, under the action of a spring 68, with a ramp 69 secured to the longitudinal slide 7.

The second lever 47 is disengaged from the nose 45 at the end of the stroke of the transverse slide 6, that is to say during the last advance in depth of this slide. For this purpose this lever is actuated by a pusher 70 actuated by a rack 71 subjected to the action of a return spring 72. The rack is actuated, against the action of its spring, by the toothed wheel 54 which is in engagement with a pinion 73 itself in engagement with the rack 71. The position of rest or starting of the rack is secured by a stop 74 adjustable in position by means of the screw 75. As the rack is connected by a gear to the rotary cam 51 the stop 74 also fixes the angular starting position of the said cam.

When the roller 50 reaches the summit of the cam 51, the rack 71 produces the disengagement of the lever 47 from the nose 45 by means of a train of transmission members.

The longitudinal slide 7 is provided of sufficient length to allow of securing a number of tool holders 78 on its upper face. Each of the tool holders is provided to receive a tool 79 adapted for cutting a screw thread.

The operation of the automatic screw cutting lathe, as will be seen from the foregoing, is similar to that of known lathes of this type.

When the lathe is at rest, the lever 106 is disengaged from the finger 107, the clutch 35 is in the disengaged position, the transverse and longitudinal slides rest against their respective stops 9 and 44. The rack 71 is also against its stop 74, the lever 46 is disengaged as also the lever 47, finally the end 40 of the pusher 38 is seated in a recess 80 of the rule 41.

The motor M being under voltage, the setting in operation of the lathe is obtained by the operation of the manual member L in a clockwise direction for bringing it up to the position shown in the drawing.

This operation produces:

1. The engagement of the driving and driven parts of the clutch 35,

2. The actuation of the transverse slide 6 from its position of rest against the action of its return spring, up to its advanced position for which the tool is not yet in engagement with the part 4, 3. The engagement of the lever 47 with the nose 45 under the action of a spring.

This rest position of the transverse slide is defined by the position of the stop 74 in a slot of rack 71. The engagement of this stop with the inner end of the slot defines the angular starting position of the rotary cam 51.

During this movement of the slide 6, the ramp 76 has, in fact, left the finger 77 so that the retaining pawl comes into engagement with the ratchet wheel under the action of the return spring 65.

When the clutch 35 is in the engaged position the shaft 32 sets in rotation the cam 31 which produces an angular movement of the arm 30, of which the end rests on its profile. This angular movement of the arm 30 produces:

1. The translation of the finger 27 and the engagement of the nut 25 with the threads of the lead screw 10, 2. By means of the toothed sectors 111, 110, 104 and the rack 102, the movement, towards the right of the drawing, of the rod 101 and the compression of the spring 100, 3. The angular movement of the arm 106 up to the position shown in the drawing, for which the finger 107, cooperating with the end of the said arm prevents any movement of the rod 101 under the action of the spring 100, 4. By means of the pusher 103, the oscillation of the finger 61 and the movement of the rule towards the left of the drawing up to the position shown. For this position of the rule the end 40 of the rack 38 has left the recess 80 and has produced a transverse feed of the slide 6 bringing the point of the tool flush with the surface of the part to be machined, 5. By means of the pusher 103, the rotation in a clockwise direction of the actuating crank pin for the feed in depth. This angular movement of the crank pin 60 produces the swinging, in a counterclockwise direction, of the lever 57 and the actuation in the same direction of the ratchet wheel 53 by means of the feed pawl 55.

6. The angular movement of the universal cam 51, secured to the ratchet wheel 53, which movement produces, by means of the roller 50, the levers 47, 48, the nose 45, the toothed sector 37 in engagement with the rack 38, a further movement of the latter which actuates the transverse slide 6, against the action of its return spring, and produces the feed in depth of the tool and the engagement of same with the part which is being machined.

As the lead screw is rotating and the nut engaged, the former is subjected to an axial movement towards the right of the drawing. During its movement it so drives the slide 7 that as the part 4 is being driven in rotation by the motor M, the tool 79 cuts a thread.

At the end of the working stroke a stop 81 actuates a pusher 82 against the action of the spring 109 and produces the disengagement of the bolt 107, 103 which holds the relay in the set position (position shown). Pusher 82 is rigid with a rod 117 urged by spring 109 toward pusher 82 and connected to an arm 118 rigid with shaft 108.

From now on the relay, formed by the spring 100, is set in action and produces:

1. The sudden and rapid return of the nut,
2. The movement to the right of the drawing of the rule 41 until the recess 80 is opposite the end 40 of the rack 38. At this moment the spring 43 produces the recoil of the slide 6 as also the disengagement of the tool from the part which is being machined.
3. The actuation in a clockwise direction of the pawl 55.

As the nut is disengaged from the lead screw, the spring 8 repels the longitudinal slide 7 up to its position of rest, defined by the stop 9. At the end of the return stroke, the ramp 69 actuates the finger 67 against the action of its spring 68 and produces the disengagement of the lever 46 from the nose 45 (position shown in the drawing).

As the shaft 32 continues its rotation the cam 31 again actuates the lever 39 and the same cycle of movement is effected a second time.

However in order to prevent the cam 31 from actuating the lever 39 at the moment of opening the bolt 107, 106 which would prevent the withdrawal of the nut, an interlocking device is provided. This device prevents the action of the lever 39 by the cam 31 as long as the bolt 83, 84 is in the position shown in the drawing, that is to say in the closed position. This device is formed by a bolt 83, 84 held in the closed position (position shown) by a spring (not shown). The part 83 of the bolt, carried by a lever 88 and pivoted at 85, is actuated, against the action of the return spring, at the end of the return stroke of the longitudinal slide. For this purpose the pusher 19 carries a driving finger 86 adapted to cooperate with a pin 87 secured to the lever 88. The second part 84 of the bolt is formed by an arm secured to a sleeve 90 mounted loose on the shaft 29. This sleeve carries a second arm 91 carrying a pin 92 adapted to cooperate with a ramp 93 secured to the cam 31. The cam 31 by cooperating with the lever 39 produces the resetting of the bolt 83, 84. The cam 31 slides on the shaft 32 and a spring 89 tends to hold it out of the range of the lever 39 so that it cannot produce the oscillation of the latter as long as the bolt 106, 107 is in the position shown.

When the bolt 83, 84 is open, the arm 91 oscillates and the pin 92 cooperating with the ramp 93 moves the cam 31, against the action of its spring 89, through an amount sufficient to cause it to cooperate with the lever 39. Thus it is only when the longitudinal slide is in the position of starting the machining that the cam 31 can produce:

1. The engagement of the nut with the lead screw,
2. The resetting of the relay formed by the spring 100,
3. The feed in depth of the tool, by actuating the ratchet wheel 53,
4. The setting in the operative position of the tool by actuating the rule 41.

Thus the security in operation is complete and no error in control can occur irrespective of the speed of rotation of the spindle.

The tool, during each working stroke, always cuts the thread deeper into the part 4. Finally during the last feed in depth controlled by the rotary cam 51, the rack 71, actuated by the shaft 52, acts, by means of the train of transmission members, on the lever 47 and produces a sufficient movement of the latter in order to bring it out of engagement with the nose 45. After carrying out the last working stroke, when the slide 7 returns to the starting position, the ramp 69 actuates the pusher 67 which produces the disengagement of the lever 46 from the nose 45, as above described. But as the lever 47 is now also out of range of the nose 45, the transverse slide 6 is entirely released and returns, under the action of its springs 43, into the position of rest defined by the stop 44. During this movement, the ramp 76 actuates the finger 77 which produces the disengagement of the retaining pawl 63. The latter drives, during its movement, the feed pawl 55 by means of a nose 99. The ratchet wheel 53 is thus released completely and returns, under the action of the spring 72, to its rest position defined by the stop 74.

The return of the slide 6 also produces the actuation of the pusher 82 against the action of the spring 109 in such a manner as to hold the two parts of the bolt 106, 107 in the disengaged position.

From the foregoing it will be seen that the longitudinal slide must necessarily effect the same movements as the lead screw, which ensures the precision of the pitch of screwing on the part 4, clearance being capable of being reduced easily to a minimum and on the other hand as the thrusts always act in the same direction, these clearances are practically eliminated. Further the disengagement of the nut is controlled by a quick action relay set in operation by the movements of the longitudinal slide in such a manner that this disengagement is always controlled with precision at desired moments on the one hand, and is effected on the other hand by a sudden and rapid movement of the nut 25 under the action of the relay, whereby there is avoided as far as possible wear of the nut and local wear of the lead screw.

Finally as the tool holder carriage is provided with a lower transverse slide carrying an upper longitudinal slide, the lathe has various other important technical advantages.

In the first instance, the length of the slide adapted to receive the tool holder is no longer limited except by the dimensions of the lathe, that is to say by the distance separating the spindle from the back center. It is thus possible to secure a number of tool holders corresponding with the number of the various screw threads of the same pitch to be produced on the part to be machined.

Further the entire device for controlling the movements of the crossed slides of the tool holder carriage may be secured on the framework of the lathe in such a manner that the carriage is relieved of the whole of the weight of these latter. This results in greater stability of this movable part and thus a greater precision in machining. The inertia of the parts in movement being less, the wear of the lathe is reduced correspondingly.

As the upper slide effects a longitudinal movement, the construction of the tool holder is simplified as the dimensions of the latter must only be such as to allow of the securing of the tool holders and no longer for receiving the transverse slide as in known lathes. In a construction such as described, the tools are thus much more stable, the guiding of the parts which carry them may be so dimensioned as to avoid any exaggerated wear.

Another advantage of the lathe described consists in the fact that the cam 51 for feed in depth may be formed by a universal cam, which avoids the manufacture of a special cam for each part to be screw threaded. These cams are in fact very expensive and the machining of their ramp must be very precise and respond to very strict conditions. By reason of the stop 74, adjustable in position enabling the position of rest of the rack and thus the angular starting position of the cam 51 to be fixed on the one hand, and of the adjusting screw 75 enabling the position of the rack 71 to be fixed and thus the fixing of the angular position of the cam 51 for which the bolt 47, 45 is disengaged for the purpose of releasing the rack 38 and the return to the position of rest of the transverse slide 7, on the other hand, it is possible to select the sector of the profile of the cam 51 to be used in each precise case in a manner to obtain the desired decreasing feed of the tools.

Finally as the transverse slide returns to the position of rest against its stop 44 it produces automatically the return to the starting position of the cam 51 by the simultaneous disengagement of the pawls 63 and 55 from the ratchet wheel; which disengagement is produced by the ramp 76 acting on the finger 77.

In the form of construction shown in Fig. 2 the screw cutting lathe has a device for controlling the movements of the slides of the tool holder carriage which corresponds in every respect with that described with reference to Fig. 1, except as regards the automatic stopping device. In Fig. 2 the members corresponding with those in Fig. 1 are indicated by the same reference numerals. The return of the longitudinal slide after each working stroke is controlled in exactly the same manner as in the form of construction according to Fig. 1; the same applies as concerns the feed in depth of the transverse slide after each cut. It is however to be observed that the nose 45 cooperates with the single lever 47. The disengagement of this lever from the nose 45 instead of being effected progressively under the action of successive movements of the rack 71, is produced by the placing under voltage of an electro-magnetic relay 125. The feed circuit of the winding 116 of this relay is controlled by a suddenly closing switch 117 of which the closing is produced by the movements of the rack 71.

This second form of construction has some advantages relatively to that of Fig. 1. In fact during the last cuts the feed of the tool in depth must be very small or even zero if it is desired to obtain a clean thread. It thus follows that the movements of the rack are small and in the case of Fig. 1, the lever 47 is only slightly engaged under the nose 45. The nose and the end of the lever 47 are deformed rapidly so that it is necessary to provide a ramp on the end of the lever 46 to allow of its engagement. It will be clear that such a ramp renders any precision illusory.

As will be seen readily, in the construction according to Fig. 2, the lever 47 always remains fully engaged with the nose 45, the relay producing its sudden disengagement after the last cut, during the last return of the longitudinal slide to the rest position. It will be seen that even when the last portion of the profile of the cam 51 is circular, in such a manner as to obtain the desired precision and neatness of the screw thread, as the movement of the rack is independent of the profile of the cam 51, the sudden closing of the switch 117 and thus the setting under voltage of the relay 125 are always ensured with precision.

It will be understood that the relay 125 may be formed in a modified form of construction by another sudden action relay such as a spring held in a set position by a bolt, a pneumatic or hydraulic relay.

Two forms of construction of an automatic screw cutting lathe have been described herein by way of example and with reference to the accompanying diagrammatic drawing, but it will be understood that all the members and devices described may be replaced by their equivalents. Thus the relay 100 may be formed by an electromagnet placed under voltage by a contact actuated by the longitudinal slide for example. Similarly the device for controlling the engagement of the nut may be formed by an electromagnet placed under voltage by a contact actuated by the movements of the longitudinal slide.

The nut may also be mounted on a shaft and carry out an oscillating movement in a plane perpendicular to the axis of the spindle.

Finally the lead screw, as in known lathes, may be mounted on a rotary shaft and the nut may be mounted on an oscillating and sliding sleeve.

I claim:

1. In an automatic screw cutting lathe, the combination comprising a frame, a slide mounted on said frame for movement transversely thereof and urged away from the work, a second slide mounted on said first slide for movement longitudinally of said frame, a lead screw rotatably and axially movable on said frame and connected to said longitudinal slide, a lead nut engageable with said screw and guided by the frame for movement in a plane perpendicular to the screw axis, a motor for rotating said screw, operable means moving said nut to screw engaging position, means driven by said motor and operating said first means at the beginning of the working stroke of said longitudinal slide, yieldable means connected to said first means and stressed by the operation thereof moving said nut to screw engaging position, means engageable with said yieldable means and urged to a position holding same in stressed condition, means actuated by said longitudinal slide at the end of its working stroke to release said holding means from said yieldable means to enable same to retract said nut from said screw, operable means feeding the transverse slide toward the work and including a nose for said transverse slide, means reacting against said nose and connected to said yieldable means and moving said transverse slide toward the work upon the stressing of said yieldable means at the beginning of the working stroke of the longitudinal slide.

2. The combination of claim 1 and also comprising means holding said nose during the operation of said means reacting against said nose, said nose holding means being releasable from said nose by said longitudinal slide upon completion of its return stroke.

3. The combination of claim 2 and said transverse slide moving means moving said nose through a distance successively increasing with each working stroke of said longitudinal slide.

4. The combination of claim 3 and also comprising means operated by said transverse slide upon release of said nose holding means from said nose and returning said means moving said nose through a distance successively increasing to initial position.

ERNEST BODMER.

REFERENCES CITED

The following references are of record in the file of this patent:

UNITED STATES PATENTS

| Number | Name | Date |
|---|---|---|
| 9,677 | Newbury | Apr. 19, 1853 |
| 400,550 | Darling | Apr. 2, 1889 |
| 796,171 | Ambrose | Aug. 1, 1905 |
| 1,444,109 | Clay | Feb. 6, 1923 |
| 1,482,390 | Eden | Feb. 5, 1924 |
| 1,520,494 | Drake | Dec. 23, 1924 |
| 1,738,642 | Crehan et al. | Dec. 10, 1929 |
| 2,101,754 | Randall | Dec. 7, 1937 |

FOREIGN PATENTS

| Number | Country | Date |
|---|---|---|
| 519,560 | France | Jan. 26, 1921 |
| 540,721 | Great Britain | Oct. 27, 1941 |
| 560,313 | France | July 5, 1923 |